(12) United States Patent
Durkin et al.

(10) Patent No.: US 6,266,878 B1
(45) Date of Patent: Jul. 31, 2001

(54) PROCESS FOR PRODUCING VARIABLE DISPLACEMENT COMPRESSOR PISTONS HAVING HOLLOW PISTON BODIES AND INTEGRAL ACTUATOR RODS

(75) Inventors: Robert John Durkin, Bluffton; Steven Lee Worthington, Decatur, both of IN (US)

(73) Assignee: Amcast Industrial Corporation, Dayton, OH (US)

( * ) Notice: Subject to any disclaimer, the term of this patent is extended or adjusted under 35 U.S.C. 154(b) by 0 days.

(21) Appl. No.: 09/243,178

(22) Filed: Feb. 2, 1999

(51) Int. Cl.⁷ ........................................ B23P 15/00
(52) U.S. Cl. .......................... 29/888.044; 29/888.043
(58) Field of Search ...................... 29/888.047, 888.042, 29/888.044

(56) References Cited

U.S. PATENT DOCUMENTS

| | | |
|---|---|---|
| 1,946,117 | 2/1934 | Sparks . |
| 2,513,710 | 7/1950 | Brauchler . |
| 3,305,918 * | 2/1967 | Christen et al. ................ 29/888.047 |
| 4,321,818 | 3/1982 | Bessho . |
| 4,356,612 | 11/1982 | Becker et al. . |
| 4,404,262 * | 9/1983 | Watmough ..................... 29/888.044 |
| 4,847,968 | 7/1989 | Shirai et al. . |
| 5,551,388 * | 9/1996 | Slee ............................... 29/888.047 |
| 5,575,172 | 11/1996 | Bonny et al. . |
| 5,992,015 * | 11/1999 | Kurita et al. ................... 29/888.044 |

FOREIGN PATENT DOCUMENTS

| | | |
|---|---|---|
| 974 022 | 8/1960 | (DE) . |
| 196 20 167 | 3/1997 | (DE) . |
| 0 896 854 | 2/1999 | (EP) . |
| 58-077736 | 5/1983 | (JP) . |
| 60-168960 | 9/1985 | (JP) . |
| 9-256952 | 9/1997 | (JP) . |

* cited by examiner

*Primary Examiner*—I Cuda Rosenburg
(74) *Attorney, Agent, or Firm*—Killworth, Gottman, Hagan & Schaeff, L.L.P.

(57) ABSTRACT

Variable displacement pistons are produced wherein hollow piston bodies are integrally formed with associated actuator arms to ensure proper alignment of the bodies and rods. The process utilizes a two-axis press to first form a pair of actuator arms by working a blank of metallic material along a first axis between opposing members of a die assembly. With the die assembly still closed after formation of the actuator arms, a pair of hollow piston bodies are formed by extruding the remainder of the blank of metallic material along a second axis. The hollow piston bodies are axially aligned and integrally formed with respective ones of the actuator arms. A piston head is welded to the end of each hollow piston body which is then machined. By separating the actuator arms from one another, a pair of variable displacement compressor pistons having hollow piston bodies axially aligned and integrally formed with respective actuator arms are thus formed.

22 Claims, 8 Drawing Sheets

PROCESS FOR PRODUCING VARIABLE DISPLACEMENT COMPRESSOR PISTONS HAVING HOLLOW PISTON BODIES AND INTEGRAL ACTUATOR RODS

BACKGROUND OF THE INVENTION

The present invention relates in general to a variable displacement compressor piston, and, more particularly, to a variable displacement compressor piston having a hollow piston body axially aligned and integral with an actuator rod.

Variable displacement compressor pistons are used in a variety of applications including, for example, compressors used in automobile air conditioning systems. One method of producing such a piston involves forging a solid piston body with an accompanying integral actuator arm. A piston ring is added to the solid piston body to maintain sufficient air compression as the piston slides in a bore in a reciprocal fashion during compressor operation. The two components of such a piston must be manufactured separately and be later assembled thereby increasing production time and cost. Further, the solid piston body has a relatively large mass which increases reciprocating inertia in the system, and thus, reduces efficiency of the piston.

Another method of producing a variable displacement piston involves manufacturing a hollow piston body, typically by extrusion, and welding the hollow piston body to an actuator arm, which is typically formed by forging. The outer surface of the hollow piston body is machined along its length such that a piston ring is not required to maintain sufficient air compression during piston strokes. However, two parts still must be manufactured and assembled. Further, the piston body and actuator arm require machining to produce an appropriate surface at the joint where the two parts are welded together. The machining operation requires that the piston body and the actuator arm be precisely aligned during welding which is difficult. Improper alignment, due to lack of straightness, concentricity, perpendicularity and runout can result in unusable pistons once the machining operation is performed.

Accordingly, there is a need for a process of producing variable displacement compressor pistons which can be machined with little or no possibility of rendering the pistons unusable due to the machining operations. Preferably, such a process would produce pistons having relatively little mass and requiring no piston rings. Further, to improve manufacturing efficiency and accordingly expense, the process should require fewer and/or more simplified manufacturing steps.

SUMMARY OF THE INVENTION

The present invention meets this need by providing a process for producing variable displacement compressor pistons more efficiently and wherein hollow piston bodies are integrally formed with associated actuator arms to ensure proper alignment of the bodies and rods and thereby substantially eliminate machining problems associated with prior art pistons. The process utilizes a two-axis press to first form a pair of actuator arms by working a blank of metallic material along a first axis between opposing members of a die assembly. With the die assembly still closed after formation of the actuator arms, a pair of hollow piston bodies are formed by extruding the remainder of the blank of metallic material along a second axis. The hollow piston bodies are axially aligned and integrally formed with respective ones of the actuator arms. A piston head is welded to the end of each hollow piston body which is then machined and the actuator arms are separated from each other. A pair of variable displacement compressor pistons having hollow piston bodies axially aligned and integrally formed with respective actuator arms are thus formed.

According to a first aspect of the present invention, a process for forming a piston having an integral actuator arm comprises providing a blank of metallic material. The blank of metallic material is worked along a first axis so as to form at least one actuator arm. The blank of metallic material is also worked along a second axis so as to form at least one hollow piston body axially aligned with and integrally formed with the one actuator arm.

The step of working the blank of metallic material along a first axis so as to form at least one actuator arm may comprise the step of working the blank of metallic material along the first axis so as to form interconnected first and second actuator arms while the step of working the blank of metallic material along a second axis so as to form at least one hollow piston body axially aligned with and integrally formed with the at least one actuator arm may comprise the step of working the blank of metallic material along the second axis so as to form a first hollow piston body axially aligned with and integrally formed with the first actuator arm and a second hollow piston body axially aligned with and integrally formed with the second actuator arm. The process may further comprise coupling a first piston head to the first hollow piston body and coupling a second piston head to the second hollow piston body. The step of coupling a first piston head to the first hollow piston body may comprise the step of welding the first piston head to the first hollow piston body and the step of coupling a second piston head to the second hollow piston body may comprise the step of welding the second piston head to the second hollow piston body. The process may further comprise the step of separating the first and second interconnected actuator arms. The step of separating the first and second interconnected actuator arms may comprise the step of severing the blank of metallic material between the first and second interconnected actuator arms.

The step of working the blank of metallic material along a first axis so as to form at least one actuator arm may comprise positioning the blank of metallic material in a first stationary portion of a split die assembly. A second portion of the split die assembly is positioned over the first portion of the split die assembly with the first and second portions of the split die assembly forming a cavity. A first portion of the cavity has a shape corresponding to the shape of the at least one actuator arm. Pressure is applied to the second portion of the split die assembly along the first axis thereby forcing the second portion of the split die assembly towards the first portion of the split die assembly and working the blank of metallic material between the first and second portions of the split die assembly.

The step of working the blank of metallic material along a second axis so as to form at least one hollow piston body axially aligned with and integrally formed with the at least one actuator arm may comprise inserting at least one punch through a second portion of the cavity of the split die assembly positioned substantially adjacent the first portion of the cavity and having a diameter corresponding to an outer diameter of the first hollow piston body. The punch has a diameter corresponding to an inner diameter of the hollow piston body. Pressure is applied with the punch along the second axis to the blank of metallic material thereby back extruding the hollow piston body over the punch. The step of inserting at least one punch through the second portion of the cavity of the split die assembly and applying pressure with the punch along the second axis to the metallic material are preferably carried out with the second portion of the split die assembly engaging the first portion of the split die assembly.

The step of providing a blank of metallic material may comprise providing a block of metallic material having first and second surfaces forming planes that are generally perpendicular to the first axis and third and fourth surfaces forming planes that are generally perpendicular to the second axis. A portion of the block of metallic material is removed from the first side along a central portion of the block of metallic material. The step of removing a portion of the block of metallic material along a central portion of the block of metallic from the first side of the block of metallic material may comprise the step of forming a plurality of notches thereby forming at least a pair of generally symmetrical ribs. Preferably, the blank of metallic material comprises aluminum.

According to another aspect of the present invention, a process for forming a pair of pistons having integral actuator arms comprises providing a blank of metallic material. The blank of metallic material is worked along a first axis so as to form interconnected first and second actuator arms. The blank of metallic material is also worked along a second axis so as to form a first hollow piston body axially aligned and integral with the first actuator arm and a second hollow piston body axially aligned and integral with the second actuator arm. A first piston head is coupled to the first hollow piston body and a second piston head is coupled to the second hollow piston body. The first and second interconnected actuator arms are separated thereby forming a first piston having the first hollow piston body axially aligned and integral with the first actuator arm and a second piston having the second hollow piston body axially aligned and integral with the second actuator arm.

The step of coupling a first piston head to the first hollow piston body may comprise the step of welding the first piston head to the first hollow piston body and the step of coupling a second piston head to the second hollow piston body may comprise the step of welding the second piston head to the second hollow piston body. The step of separating the first and second interconnected actuator arms may comprise the step of sawing the blank of metallic material between the first and second interconnected actuator arms. The step of separating the first and second interconnected actuator arms may be performed prior to coupling a first piston head to the first hollow piston body and coupling a second piston head to the second hollow piston body.

The step of working the blank of metallic material along the first axis thereby forming interconnected first and second actuator arms may comprise positioning the blank of metallic material in a first stationary portion of a split die assembly. A second portion of the split die assembly is positioned over the first portion of the split die assembly with the first and second portions of the split die assembly forming a cavity. A first portion of the cavity has a shape corresponding to a shape of the interconnected first and second actuator arms. Pressure is applied to the second portion of the split die assembly along the first axis thereby forcing the second portion of the split die assembly towards the first portion of the split die assembly and working the blank of metallic material between the first and second portions of the split die assembly.

The step of working the blank of metallic material along the second axis thereby forming a first hollow piston body and a second hollow piston body may comprise inserting first and second punches through second and third portions of the cavity of the split die assembly. The second and third portions of the cavity are positioned substantially adjacent opposing ends of the first portion of the cavity and have diameters corresponding to the outer diameter of the first and second hollow piston bodies, respectively, while the first and second punches have a diameter corresponding to the inner diameter of the first and second hollow piston bodies. Pressure is applied with the first and second punches along the second axis to the blank of metallic material thereby back extruding the first and second hollow piston bodies over the first and second punches, respectively. The steps of inserting first and second punches through second and third portions of the cavity of the split die assembly and applying pressure with the first and second punches along the second axis to the third and fourth ends of the blank of metallic material are preferably carried out with the second portion of the split die assembly engaging the first portion of the split die assembly.

The step of providing a blank of metallic material may comprise providing a block of metallic material having first and second surfaces forming planes that are generally perpendicular to the first axis and third and fourth surfaces generally perpendicular to the second axis. A central portion of the block of metallic material is removed from the first side of the block of metallic material. The step of removing a central portion of the block of metallic material from the first side of the block of metallic may comprise the step of forming a plurality of notches thereby forming at least a pair of generally symmetrical ribs. Preferably, the blank of metallic material comprises aluminum.

Accordingly, it is an object of the present invention to provide a process for producing a variable displacement compressor piston more efficiently. It is another object of the present invention to provide a process for producing a variable displacement compressor piston wherein a hollow body is properly aligned with an associated actuator rod so that machining of the piston does not destroy the piston. It is yet another object of the present invention to provide a process that produces a piston having relatively little mass and no piston ring. It is still another object of the present invention to provide a process that produces a piston using fewer and/or more simplified steps.

Other features and advantages of the invention will be apparent from the following description, the accompanying drawings and the appended claims.

DETAILED DESCRIPTION OF THE INVENTION

Figure 1:
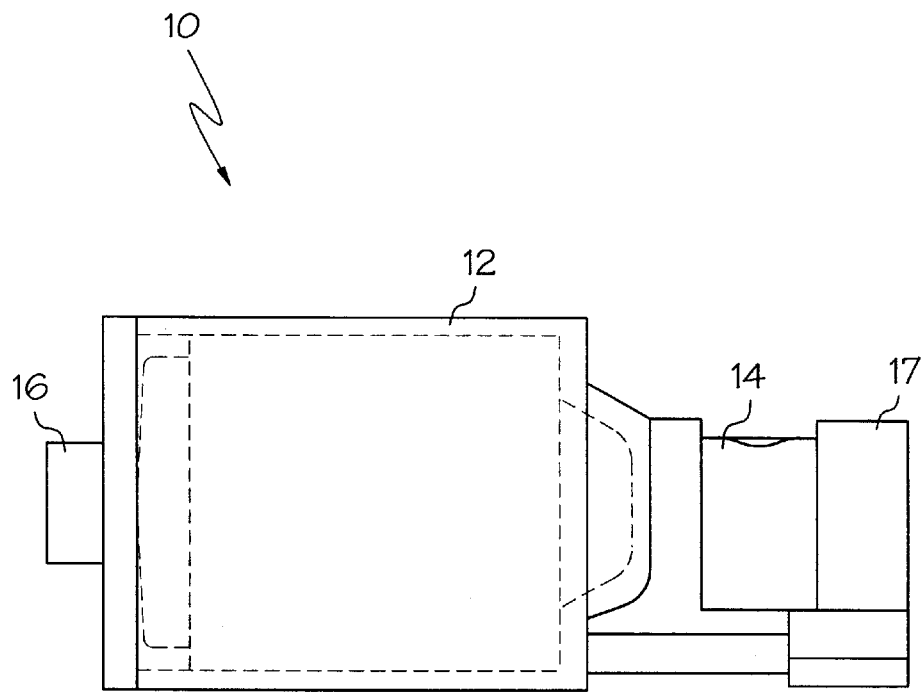
FIGS. 1 and 1A are a side view and a perspective view, respectively, of a variable displacement compressor piston manufactured according to the present invention.
Figure 1A:
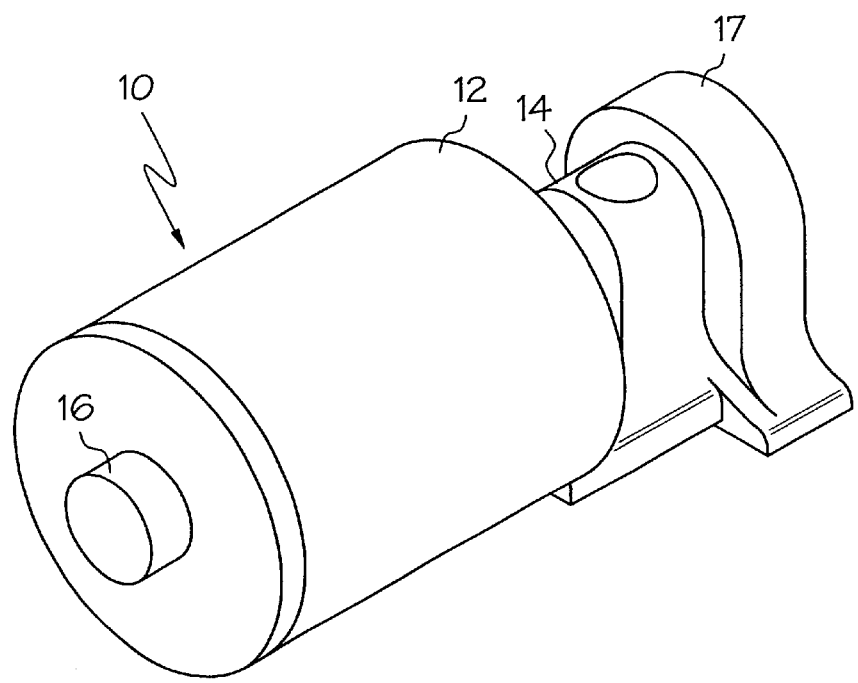

While the present invention is applicable in general to the formation of pistons having hollow piston bodies axially aligned and integral with actuator arms, it will be described herein with reference to a piston for use with a variable displacement compressor in an automobile air conditioning system for which it is particularly attractive and in which it is initially being utilized. One such piston 10 is illustrated in FIGS. 1 and 1A and comprises a hollow piston body 12, an actuator arm 14, a piston head 16 and a connection rod 17. As illustrated, the hollow piston body 12 is integrally formed and axially aligned with the actuator arm 14 along an axis A. By ensuring proper alignment of the hollow piston body 12 with the remainder of the piston, the piston 10 can be machined without destruction of the integrity of the piston which occurred in prior art pistons whenever the piston body was misaligned which, unfortunately, could be frequent.

Figure 2:
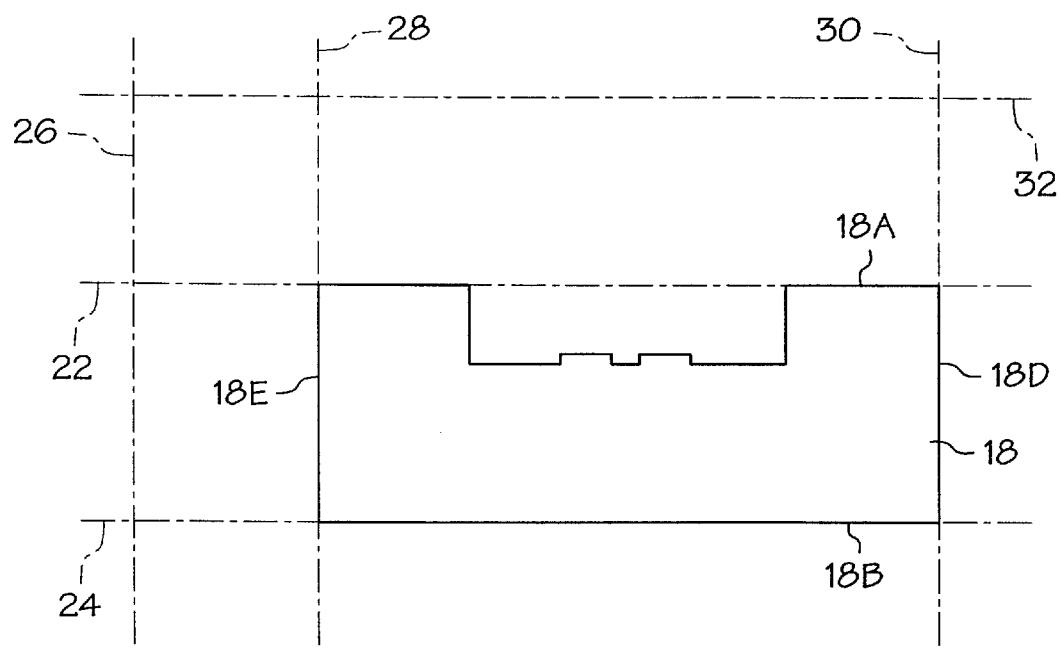
FIG. 2 is a side view of a blank of metallic material used to form the piston of FIG. 1.
Figure 3:
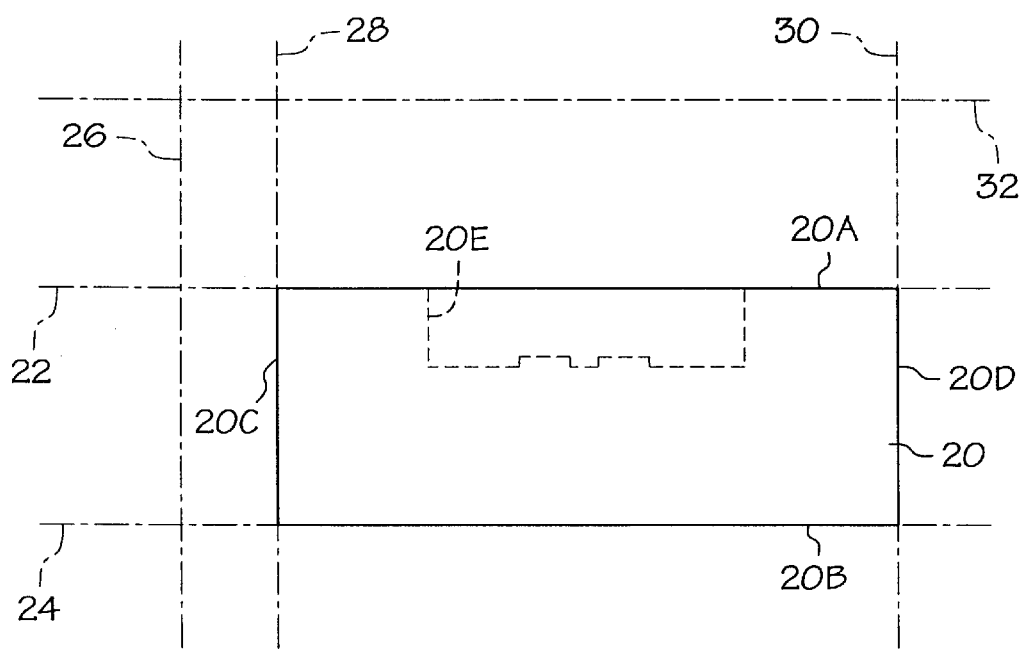
FIG. 3 is a side view of a block of metallic material used to form the blank of FIG. 2.
Figure 3A:
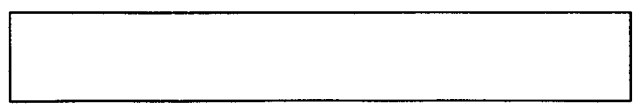
FIG. 3A is a bottom view of the block of metallic material of FIG. 3.
Figure 4:
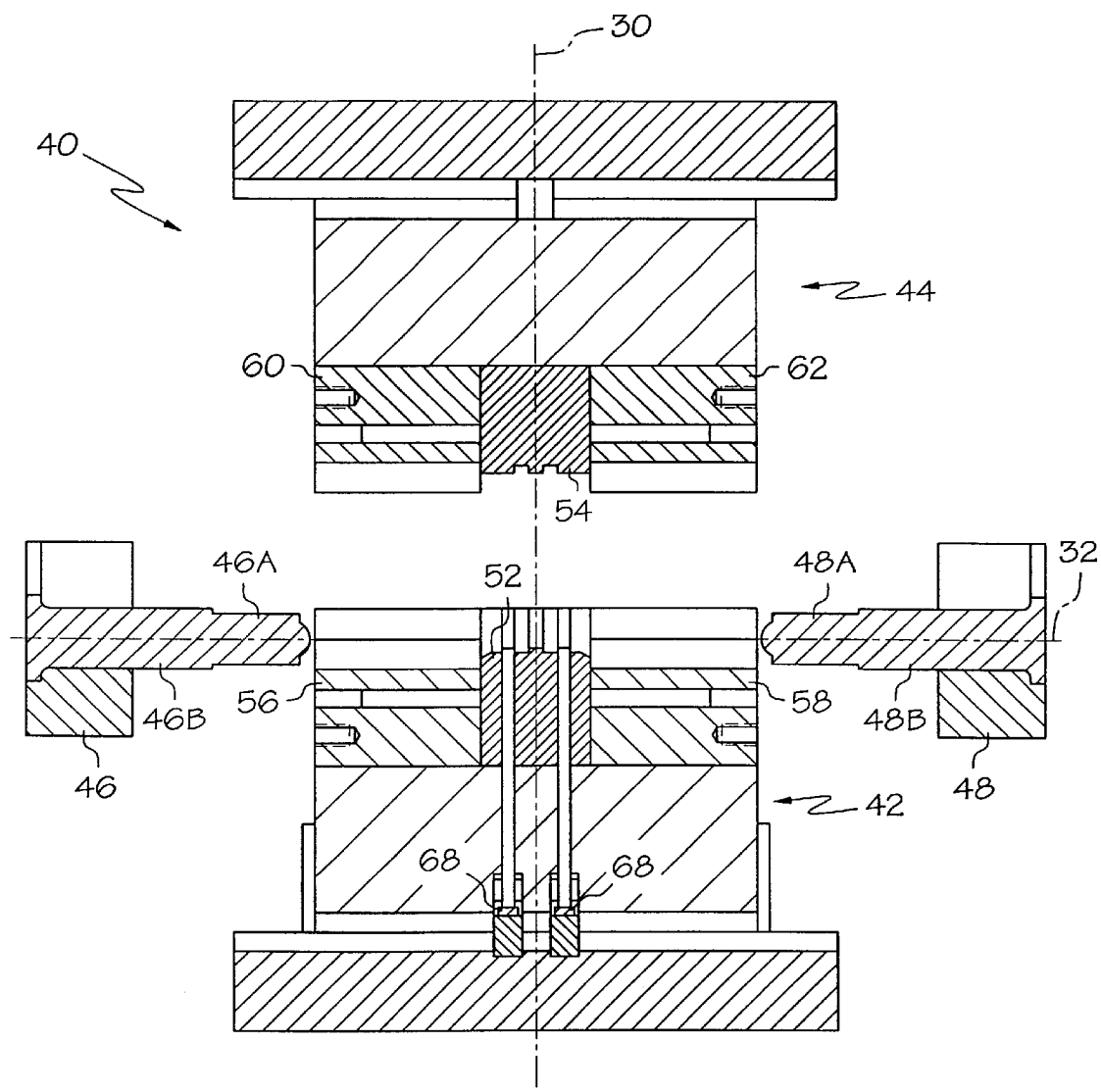
FIG. 4 is a cross-sectional view of a two-axis press used to form the piston of FIG. 1.

In the illustrated embodiment, the hollow piston body 12 and the actuator arm 14 are integrally formed from a preformed blank 18 of metallic material shown in FIG. 2. The blank 18 of metallic material is formed from a generally rectangular block 20 of metallic material shown in FIG. 3. The block 20 comprises first and second surfaces 20A, 20B forming planes 22, 24 extending into the drawing and are generally perpendicular to a first axis 26. The block 20 also comprises third and fourth surfaces 20C, 20D forming planes 28, 30 extending into the drawing and are generally perpendicular to a second axis 32. In the illustrated embodiment, the first axis 26 is substantially perpendicular to the second axis 32. The blank 18 is formed by removing a central portion 20E from the block 20 through the first side 20A.

As shown in FIG. 2, upon removal of the central portion 20E from the first side 20A of the block 20, a cavity 34 is formed with a pair of ribs 36, 38 extending therein. The ribs 36, 38 are spaced and sized to aid in the formation of a corresponding pair of connector rods 17 as described herein. For descriptive purposes, the blank 18 includes first and second surfaces 18A, 18B forming the planes 22, 24 and third and forth surfaces 18C, 18D forming the planes 28, 30. It should be apparent from the ensuing description that the hollow piston body 12 and the actuator arm 14 may be formed from other blanks of metallic material having a variety of shapes and configurations. In the illustrated embodiment, the blank 18 of metallic material comprises 4000 series aluminum. It will be appreciated by those skilled in the art that the blank 18 may also comprise other suitable metals and alloys as required for given applications.

Figure 6:
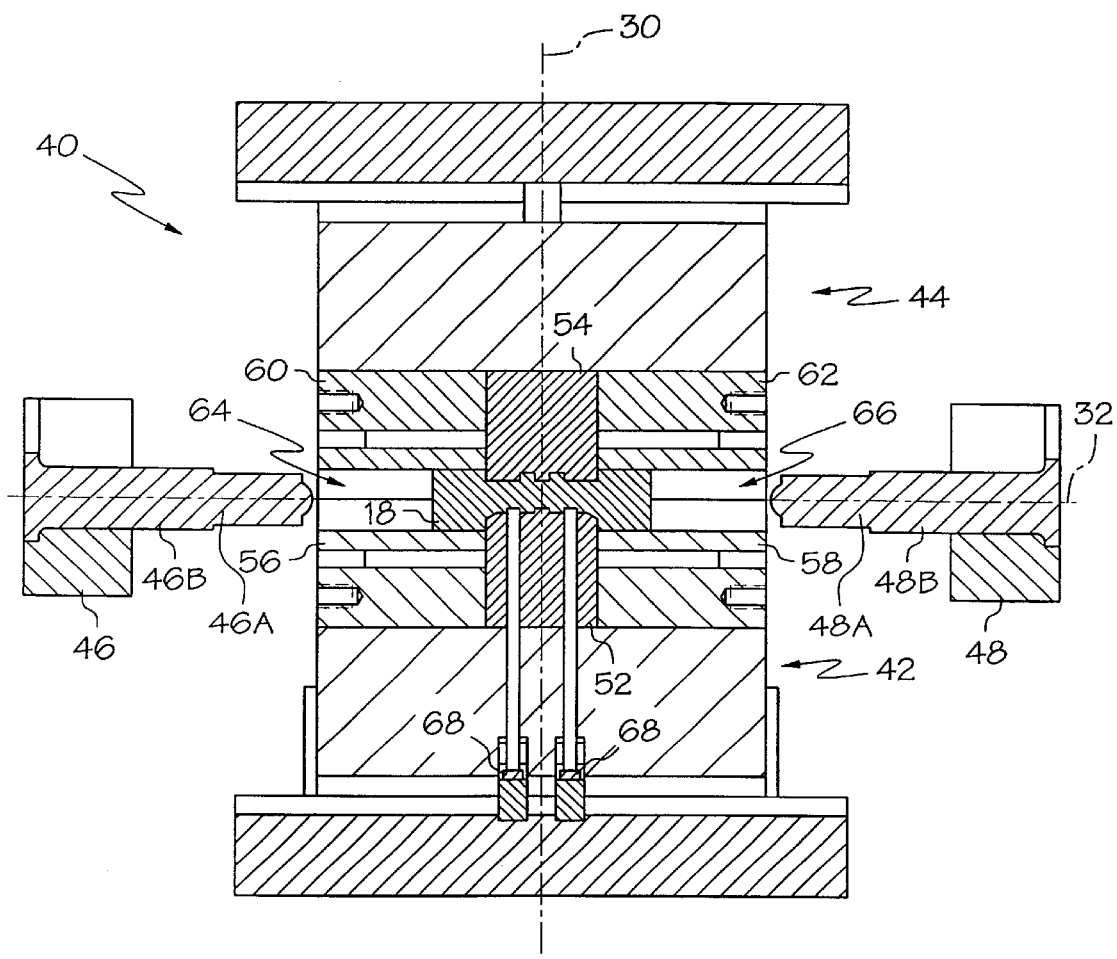
FIG. 6 is a cross-sectional view of the two-axis press of FIG. 4 with the blank of metallic material worked along a first axis.
Figure 7:
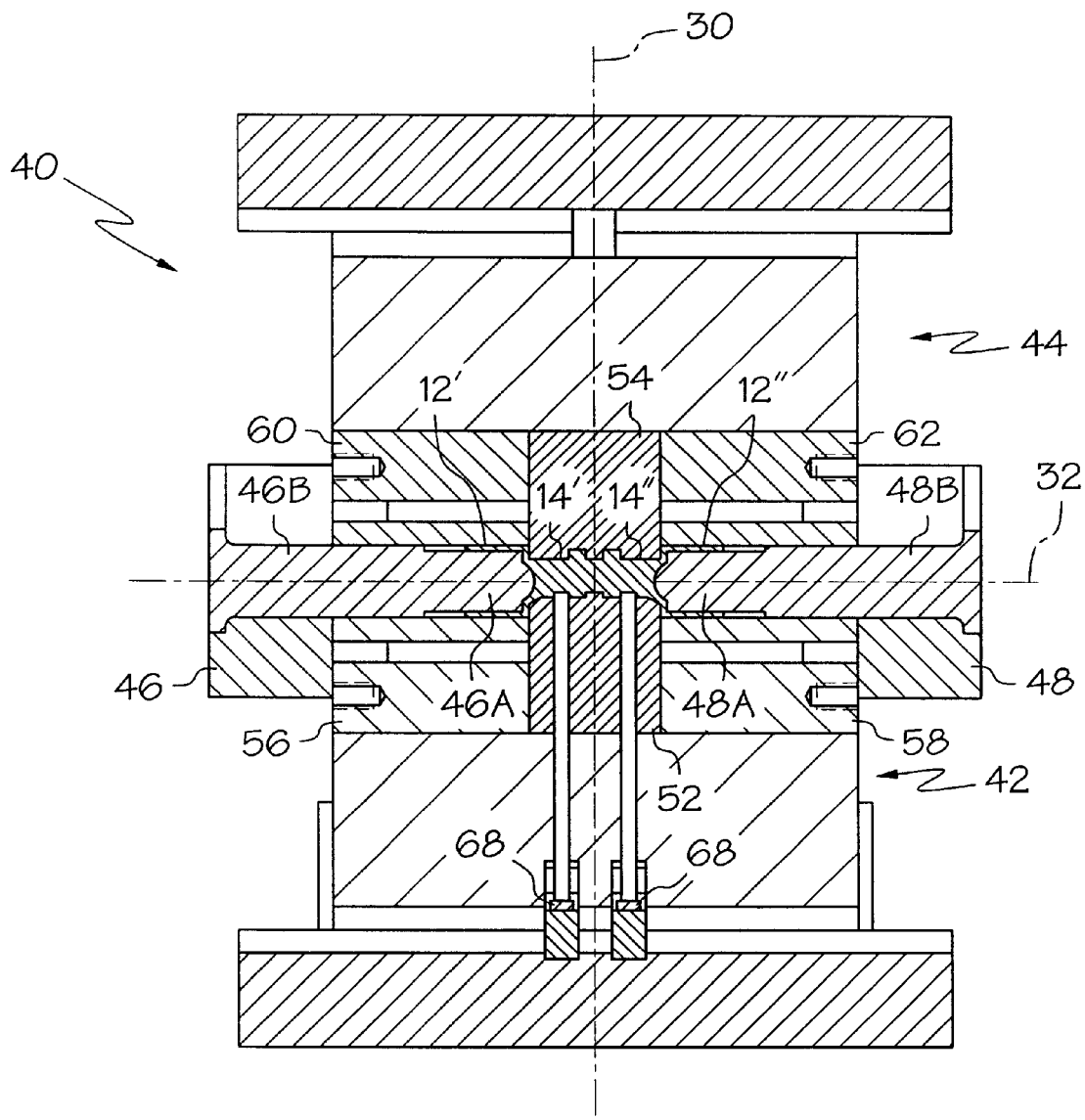
FIG. 7 is a cross-sectional view of the two-axis press of FIG. 4 with the blank of metallic material worked along a second axis.
Figure 8:
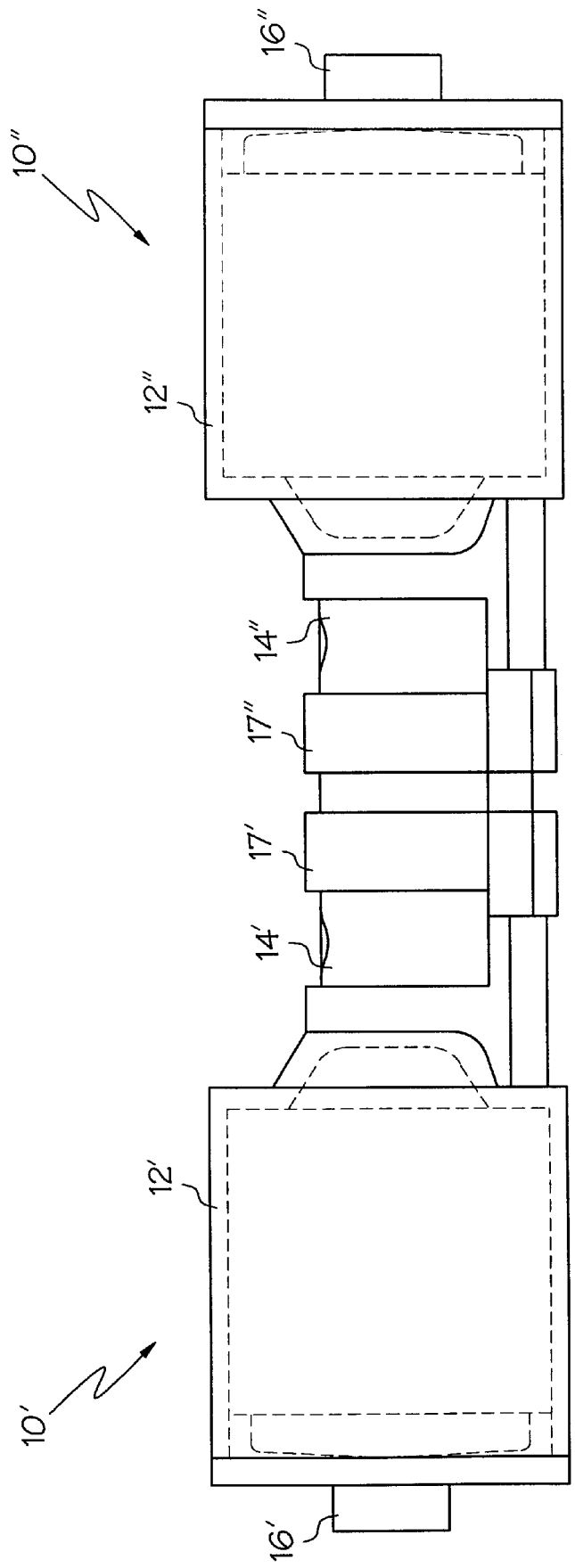
FIG. 8 is a side view of interconnected pistons formed using the two-axis press of FIG. 4.

Referring now to FIGS. 4–8, a pair of interconnected first and second pistons 10', 10", see FIG. 8, are formed using a split die assembly 40 and working the blank 18 of metallic material along the first axis 30 and then working the blank 18 along the second axis 32. As shown in FIG. 8, the pair of interconnected first and second pistons 10', 10" comprise interconnected first and second actuator arms 14', 14", first and second hollow piston bodies, 12', 12", first and second piston heads 16', 16" and first and connection rods 17', 17". For descriptive purposes, the first and second axes 30, 32 referenced in FIGS. 2 and 3 correspond to the axes of working of the blank 18 within the die assembly 40 illustrated in FIGS. 4–7.

Referring again to FIGS. 4–7, the split die assembly 40 comprises a first stationary portion 42, a second moveable portion 44, a first punch 46 and a second punch 48. The second portion 44 of the die assembly 40 moves relative to the first portion 42 along the first axis 30 while the first and second punches 46, 48 move towards each other along the second axis 32. The first portion 42 of the die assembly 40 includes a first die block 52 and the second portion 44 of the die assembly 40 includes a second die block 54. The first and second die blocks 52, 54 are aligned with each other and together form a cavity (not referenced) having a shape corresponding to the shape of the interconnected first and second actuator arms 14', 14". The first die block 52 is centered within the first portion 42 of the die assembly 40 and positioned between third and fourth die blocks 56, 58. Similarly, the second die block 54 is centered within the second portion 44 of the die assembly 40 and positioned between fifth and sixth die blocks 60, 62. As shown in FIG. 6, the third and fifth die blocks 56, 60 are aligned with each other and together form a cavity 64 having a diameter corresponding to an outer diameter of the first hollow piston body 12'. Similarly, the fourth and sixth die blocks 58, 60 are aligned with each other and together form a cavity 66 having a diameter corresponding to an outer diameter of the second hollow piston body 12".

Figure 5:
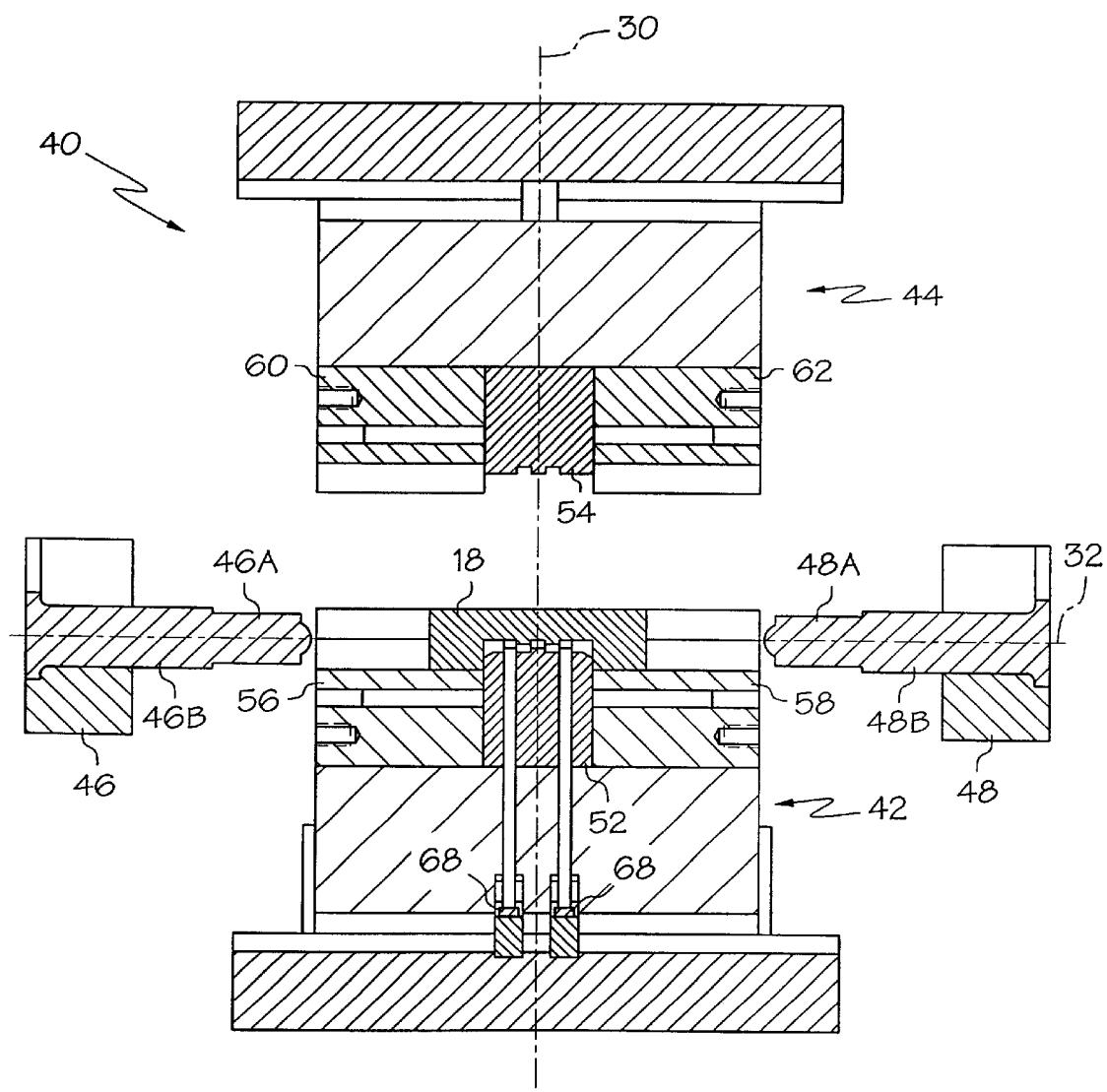
FIG. 5 is a cross-sectional view of the two-axis press of FIG. 4 with the blank of metallic material positioned therein.

As shown in FIG. 5, the blank 18 is positioned over the first die block 52 within the first portion 42 of the die assembly 40. Referring to FIG. 6, the second portion 44 of the die assembly 40 is aligned with the first portion 42 by a pair of guide posts (not shown) and moved towards the first portion 42 along the first axis 30 by a hydraulic press (not shown) thereby working the blank 18 between the first, second, third, fourth, fifth and sixth die blocks 52, 54, 56, 58, 60, 62. The interconnected first and second actuator arms 14', 14" are thus formed between the first and second die blocks 52, 54. The first and second hollow piston bodies 12', 12" are also partially formed within the cavities 64, 66 as portions of the blank 18 within the cavities 64, 66 are slightly rounded between the third, fourth, fifth and sixth die blocks 56, 58, 60, 62. However, it will be appreciated by those skilled in the art that the first and second hollow piston bodies 12', 12" can be formed without partially rounding or otherwise processing the portions of the blank 18 within the cavities 64, 66 as the blank 18 is worked along the first axis 30.

Referring now to FIG. 7, the first and second punches 46, 48 are inserted into the cavities 64, 66 and engage respective portions of the blank 18. As illustrated in FIG. 7, the first and second punches 46, 48 are inserted into the cavities 64, 66 with the second portion 44 of the die assembly 40 fully engaged with the first portion 42 (i.e., with the die assembly 40 closed). The first and second punches 46, 48 are driven towards each other along the second axis 32 by hydraulic presses (not shown). The first and second punches 46, 48 work the respective portions of the blank 46, 48 thereby causing the first and second hollow piston bodies 12', 12" to be back extruded over the punches 46, 48. A first portion 46A of the first punch 46 has a diameter corresponding to the inner diameter of the first hollow piston body 12' while a first portion 48A of the second punch 48 has a diameter corresponding to the inner diameter of the second hollow piston body 12". A second portion 46B of the first punch 46 and a second portion 48B of the second punch 48 each have a diameter corresponding to the diameter of each respective cavity 64, 66 so as to maintain the proper position of each punch 46, 48 within the die assembly 40 during the back extrusion process. It should be apparent that the thickness of the first and second hollow piston bodies 12', 12" is controlled by the diameters of the cavities 64, 66 and the diameters of the first portions 46A, 48A of the first and second punches 46, 48.

As illustrated in FIG. 7, the first and second hollow piston bodies 12', 12" are completely formed once the first and second punches 46, 48 are fully extended within the cavities 64, 66. As formed, the first actuator arm 14' is axially aligned and integral with the first hollow piston body 12' while the second actuator arm 14" is axially aligned and integral with the second hollow piston body 12" as the actuator arms 14', 14" and the piston bodies 12', 12" are formed from the same blank 18 of metallic material. The first and second punches 46, 48 are removed from the cavities 64, 66 and the second portion 44 of the die assembly 40 is disengaged from the first portion 42 exposing the interconnected first and second pistons 10', 10". The interconnected first and second pistons 10', 10" are forced out of the first portion 42 by pins 68.

The interconnected first and second pistons 10', 10" are separated from each other, for example by sawing the actuator arms 14', 14" between the connection rods 17', 17". The piston heads 16', 16" are then welded to the first and second hollow piston bodies 12', 12", respectively thereby forming two separate pistons.

Figure 9:
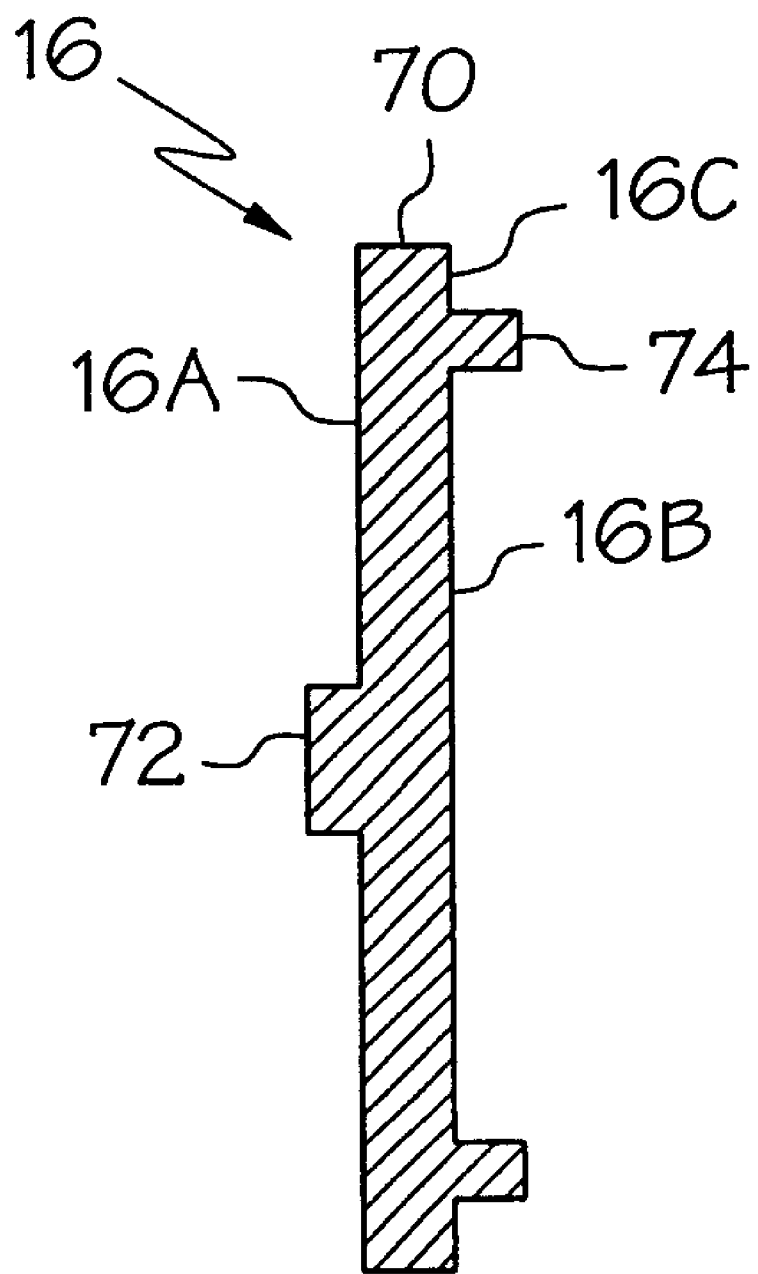
FIG. 9 is a cross-sectional view of a piston head covering a hollow piston body of the piston of FIG. 1.

As shown in FIG. 9, the piston head 16 includes a base portion 70 having a button portion 72 extending from a first surface 16A thereof and an annular ring 74 extending from a second surface 16B thereof. A shoulder 16C is formed between the annular ring 72 and the base portion 70. The base portion 70 has a diameter corresponding to the outer diameter of the hollow piston body 12 while the annular ring 72 has an outer diameter corresponding the inner diameter of hollow piston body 12. The shoulder 16C of the piston head 16 thus engages the hollow piston body 12 with the annular ring 74 maintaining the orientation of the piston head 16 within the hollow piston body 12 prior to welding. The pistons are then machined as required.

It will be appreciated by those skilled in the art that the piston head 16 may be attached to the hollow piston body 12 using other suitable methods. In the illustrated embodiment, the piston head 16 comprises 6000 series aluminum. However, it will be appreciated by those skilled in the art that the piston head 16 may also comprise other suitable metals and alloys as required for a given application.

Having described the invention in detail and by reference to preferred embodiments thereof, it will be apparent that modifications and variations are possible without departing from the scope of the invention defined in the appended claims.

What is claimed is:

1. A process for forming a piston having an integral actuator arm, said process comprising the steps of:
   providing a blank of metallic material;
   working said blank of metallic material along a first axis so as to form at least one actuator arm; and
   working said blank of metallic material along a second axis so as to form at least one hollow piston body axially aligned with and integrally formed with said at least one actuator arm.

2. The process of claim 1, wherein said step of working said blank of metallic material along a first axis so as to form at least one actuator arm comprises the step of working said blank of metallic material along said first axis so as to form interconnected first and second actuator arms, and wherein said step of working said blank of metallic material along a second axis so as to form at least one hollow piston body axially aligned with and integrally formed with said at least one actuator arm comprises the step of working said blank of metallic material along said second axis so as to form a first hollow piston body axially aligned with and integrally formed with said first actuator arm and a second hollow piston body axially aligned with and integrally formed with said second actuator arm.

3. The process of claim 2, further comprising the steps of coupling a first piston head to said first hollow piston body and coupling a second piston head to said second hollow piston body.

4. The process of claim 3, wherein said step of coupling a first piston head to said first hollow piston body comprises the step of welding said first piston head to said first hollow piston body and wherein said step of coupling a second piston head to said second hollow piston body comprises the step of welding said second piston head to said second hollow piston body.

5. The process of claim 2, further comprising the step of separating said first and second interconnected actuator arms.

6. The process of claim 5, wherein said step of separating said first and second interconnected actuator arms comprises the step of severing said blank of metallic material between said first and second interconnected actuator arms.

7. The process of claim 1, wherein said step of working said blank of metallic material along a first axis so as to form at least one actuator arm comprises the steps of:
   positioning said blank of metallic material in a first portion of a split die assembly, said first portion of said split die assembly being stationary;
   positioning a second portion of said split die assembly over said first portion of said split die assembly, said first and second portions of said split die assembly forming a cavity, a first portion of said cavity having a shape corresponding to a shape of said at least one actuator arm; and
   applying pressure to said second portion of said split die assembly along said first axis thereby forcing said second portion of said split die assembly towards said first portion of said split die assembly and working said blank of metallic material between said first and second portions of said split die assembly.

8. The process of claim 7, wherein said step of working said blank of metallic material along a second axis so as to form at least one hollow piston body axially aligned with and integrally formed with said at least one actuator arm comprises the steps of:
   inserting at least one punch through a second portion of said cavity of said split die assembly, said second portion of said cavity being positioned substantially adjacent said first portion of said cavity and having a diameter corresponding to an outer diameter of said first hollow piston body, said at least one punch having a diameter corresponding to an inner diameter of said at least one hollow piston body; and
   applying pressure with said at least one punch along said second axis to said blank of metallic material thereby back extruding said at least one hollow piston body over said at least one punch.

9. The process of claim 8, wherein said steps of inserting at least one punch through second portion of said cavity of said split die assembly and applying pressure with said at least one punch along said second axis to said metallic material are carried out with said second portion of said split die assembly engaging said first portion of said split die assembly.

10. The process of claim 1, wherein said step of providing a blank of metallic material comprises the steps of:
- providing a block of metallic material having first and second surfaces forming planes that are generally perpendicular to said first axis and third and fourth surfaces forming planes that are generally perpendicular to said second axis; and
- removing a portion of said block of metallic material from said first side along a central portion of said block of metallic material.

11. The process of claim 10, wherein said step of removing a portion of said block of metallic material along a central portion of said block of metallic from said first side of said block of metallic material comprises the step of forming a plurality of notches thereby forming at least a pair of generally symmetrical ribs.

12. The process of claim 1, wherein the step of providing a blank of metallic material comprises the step of providing a blank of aluminum material.

13. A process for forming a pair of pistons having integral actuator arms, said process comprising the steps of:
- providing a blank of metallic material;
- working said blank of metallic material along a first axis so as to form interconnected first and second actuator arms;
- working said blank of metallic material along a second axis so as to form a first hollow piston body axially aligned and integral with said first actuator arm and a second hollow piston body axially aligned and integral with said second actuator arm;
- coupling a first piston head to said first hollow piston body and coupling a second piston head to said second hollow piston body; and
- separating said first and second interconnected actuator arms thereby forming a first piston having said first hollow piston body axially aligned and integral with said first actuator arm and a second piston having said second hollow piston body axially aligned and integral with said second actuator arm.

14. The process of claim 13, wherein said step of coupling a first piston head to said first hollow piston body comprises the step of welding said first piston head to said first hollow piston body and wherein said step of coupling a second piston head to said second hollow piston body comprises the step of welding said second piston head to said second hollow piston body.

15. The process of claim 13, wherein said step of separating said first and second interconnected actuator arms comprises the step of sawing said blank of metallic material between said first and second interconnected actuator arms.

16. The process of claim 13, wherein said step of separating said first and second interconnected actuator arms is performed prior to said steps of coupling a first piston head to said first hollow piston body and coupling a second piston head to said second hollow piston body.

17. The process of claim 13, wherein said step of working said blank of metallic material along said first axis thereby forming interconnected first and second actuator arms comprises the steps of:
- positioning said blank of metallic material in a first portion of a split die assembly, said first portion of said split die assembly being stationary;
- positioning a second portion of said split die assembly over said first portion of said split die assembly, said first and second portions of said split die assembly forming a cavity, a first portion of said cavity having a shape corresponding to a shape of said interconnected first and second actuator arms; and
- applying pressure to said second portion of said split die assembly along said first axis thereby forcing said second portion of said split die assembly towards said first portion of said split die assembly and working said blank of metallic material between said first and second portions of said split die assembly.

18. The process of claim 17, wherein said step of working said blank of metallic material along said second axis thereby forming a first hollow piston body and a second hollow piston body comprises the steps of:
- inserting first and second punches through second and third portions of said cavity of said split die assembly, said second and third portions of said cavity being positioned substantially adjacent opposing ends of said first portion of said cavity and having a diameter corresponding to an outer diameter of said first and second hollow piston bodies, respectively, said first and second punches having a diameter corresponding to an inner diameter of said first and second hollow piston bodies; and
- applying pressure with said first and second punches along said second axis to said blank of metallic material thereby back extruding said first and second hollow piston bodies over said first and second punches, respectively.

19. The process of claim 18, wherein said steps of inserting first and second punches through second and third portions of said cavity of said split die assembly and applying pressure with said first and second punches along said second axis to said third and fourth ends of said blank of metallic material are carried out with said second portion of said split die assembly engaging said first portion of said split die assembly.

20. The process of claim 13, wherein said step of providing a blank of metallic material comprises the steps of:
- providing a block of metallic material having first and second surfaces forming planes that are generally perpendicular to said first axis and third and fourth surfaces generally perpendicular to said second axis; and
- removing a central portion of said block of metallic material from said first side of said block of metallic material.

21. The process of claim 20, wherein said step of removing a central portion of said block of metallic material from said first side of said block of metallic comprises the step of forming a plurality of notches thereby forming at least a pair of generally symmetrical ribs.

22. The process of claim 13, wherein the step of providing a blank of metallic material comprises the step of providing a blank of aluminum material.

* * * * *